Figure 1:
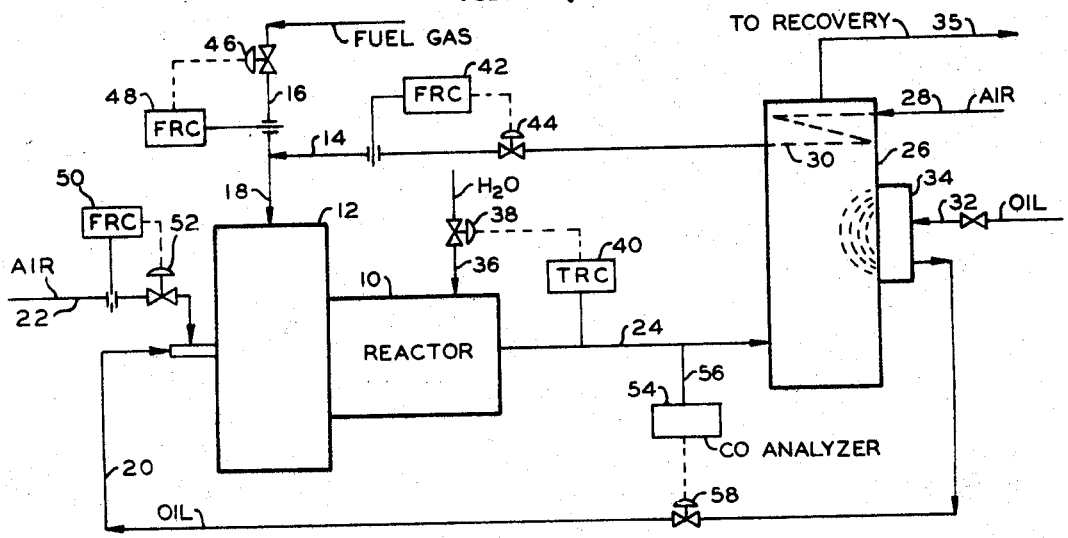

July 2, 1968  G. J. FORSETH  3,390,960
METHOD OF CONTROLLING SURFACE AREA OF CARBON BLACK
Filed May 9, 1966

INVENTOR
G. J. FORSETH
BY
*Young & Quigg*
ATTORNEYS

METHOD OF CONTROLLING SURFACE AREA OF CARBON BLACK

Glenn J. Forseth, Borger, Tex., assignor to Phillips Petroleum Company, a corporation of Delaware
Filed May 9, 1966, Ser. No. 548,473
6 Claims. (Cl. 23—209.4)

This invention relates to a method for controlling the surface area of carbon black produced by partial combustion of a hydrocarbon feedstock.

Various types of carbon blacks are produced on a large scale by thermal decomposition of gaseous or liquid hydrocarbons. Such a process comprises decomposing the hydrocarbons in the feed by heat generated from the burning of a portion of the hydrocarbon feed and/or decomposing the hydrocarbons by subjecting the feed to heat generated by the substantially complete combustion of a second, generally different, hydrocarbon feed. In any given carbon black reactor or furnace employing a particular hydrocarbon feed, the uniformity of quality as well as the yield of the carbon black produced in the reactor are related to the ratios of feed rates of the reactants. It is conventional to control a carbon black producing process to maintain desired quality and yield by determining certain characteristics of the effluent from the reactor, such as a periodic check of the photelometer, and regulating the ratio of reactant feed rates in accordance with the characteristic(s) determined.

This invention is concerned with a novel method of controlling the surface area of carbon black produced in a carbon black furnace or reactor.

Accordingly, it is an object of the invention to provide a novel and improved method of controlling the characteristics of carbon black produced by pyrolytic conversion or thermal decomposition. Another object is to provide a simple method of controlling the feed rates of oil and/or air to a carbon black producing process which is simple and effective. A further object is to provide a method of controlling a carbon black producing process so as to produce a carbon black product of selected surface area. Other objects of the invention will become apparent to one skilled in the art upon consideration of the accompanying disclosure.

It has been found that the concentration of carbon monoxide in the effluent from a furnace carbon black process provides a suitable indicator for the control of the feed rates of air and/or hydrocarbon feed to the carbon black process to produce a black of selected surface area, this characteristic of the black being a good measure of quality thereof.

The CO concentration in the effluent from a carbon black reactor is readily sensed with a chromatographic analyzer (chromatograph). A suitable instrument is a Mine Safety Appliance Chromatograph having a model 284 sensing unit containing one meter of charcoal and one meter of molecular sieve. It is preferred to control the feed rate of oil (hydrocarbon feed) to the process but it is also feasible to maintain the oil rate constant and increase or decrease the air feed rate to the reactor. It is the ratio of air to hydrocarbon with any given feed that determines the character of the carbon black produced in any given reactor with other conditions being standard.

Figure 2:
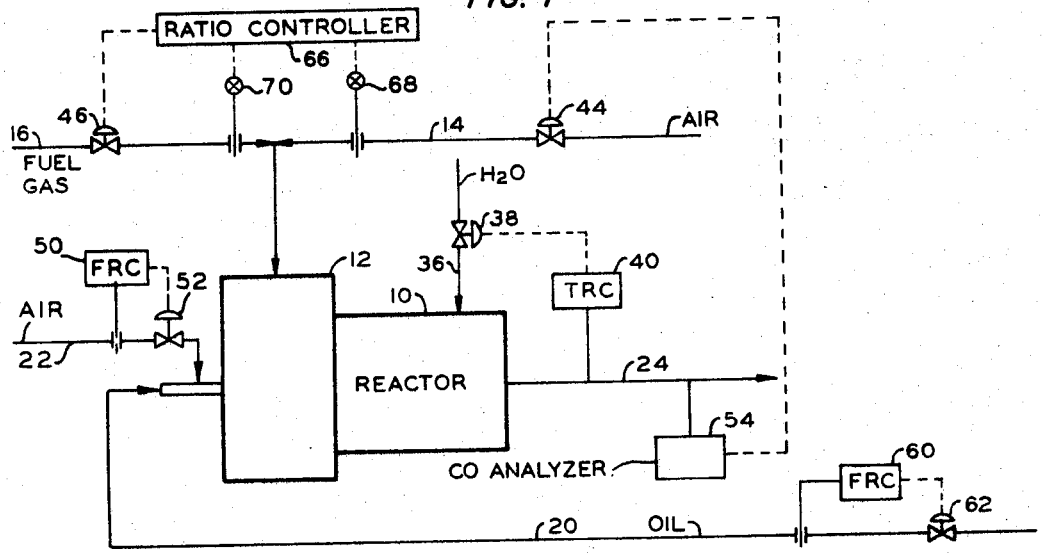
Figure 3:
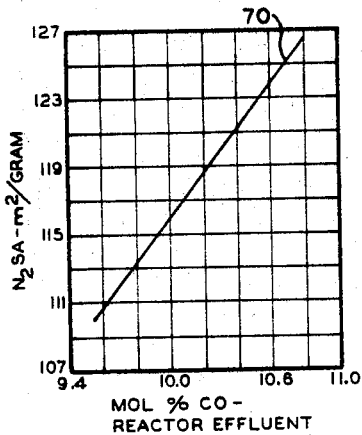

A more complete understanding of the invention may be had by reference to the accompanying schematic drawing of which FIGURE 1 is a process flow or arrangement of apparatus in accordance with the invention; FIGURE 2 is a similar view to that of FIGURE 1 illustrating another control arrangement; and FIGURE 3 is a graph showing the relationship of CO concentration to surface area of the carbon black produced in a conventional, generally cylindrical reactor.

Referring to FIGURE 1, a reactor 10 has an enlarged upstream end 12 into which air from line 14 and fuel gas from line 16 are fed tangentially thru one or more inlet lines 18 in suitable proportions for substantially complete combustion of fuel gas and preheating of the oil feed in section 12. An oil line 20 leads axially into the reactor and air line 22 connects therewith for sheathing the oil nozzle with air. Effluent line 24 leading from the downstream end of the reactor enters the lower section of heat exchanger 26.

The air passing into line 14 from supply line 28 is heated by indirect heat exchange in coil 30. Also, the oil feed from supply line 32 is heated by indirect heat exchange in heater 34 from which the heated oil passes into line 20. Both the air and oil are preheated in heat exchanger 26 as the quenched effluent (water-quenched by water introduced through line 36) passes upwardly thru exchanger 26 to effluent line 35 leading to conventional recovery equipment (not shown). Water quench line 36 leads into the downstream end of reactor 10 and a motor valve 38 therein is regulated by temperature-recorder-controller 40 which senses the temperature in effluent line 24 in conventional manner.

Control of the feed rate of tangential air at a constant value is effected by flow rate controller 42 which senses the flow rate in line 14 and regulates motor valve 44 to maintain this flow rate constant. A similar arrangement of motor valve 46 and flow rate controller 48 in line 18 maintains the flow rate of fuel gas constant.

In that embodiment of the invention illustrated in FIGURE 1, flow rate controller 50 in operative control of motor valve 52 maintains a constant predetermined flow of air into line 20 for sheathing the oil nozzle in this line. A CO analyzer 54 connected by sample line 56 with effluent line 24 determines the CO content of the effluent and is in operative control of motor valve 58 in line 20 so as to vary the oil feed when the CO concentration rises or falls from a selected CO concentration representative of the surface area desired in the carbon black product.

The small sample taken from line 24 thru line 56 is passed thru a desicant (not shown) to remove water and carbon black therefrom. Thus, the concentration is measured as a mol percent of the relatively uncondensible gases in the effluent stream from the reactor.

The embodiment of the invention illustrated in FIGURE 1 involves maintaining the flow of tangential air and fuel gas substantially constant, as well as the flow of axial air, and varying the flow rate of oil feed as the CO concentration varies in the effluent and is sensed by analyzer 54. The arrangement illustrated in FIGURE 2 varies from that of FIGURE 1 in maintaining the oil flow rate constant by means of flow rate controller 60 which is in operative control of motor valve 62, and operating motor valve 44 in air line 14 in response to the concentration of CO sensed by analyzer 54 which emits a signal proportional to CO concentration. A ratio controller 66 receives flow rate signals from transmitters 68 and 70 and maintains a preselected ratio of air to fuel gas by controlling valve 46 when the flow rate of air in line 14 is varied by instrument 54. Air flow in line 22 is maintained constant as in FIGURE 1. Corresponding elements in FIGURE 2 are numbered correspondingly to those of FIGURE 1.

Referring to FIGURE 3, line 70 represents the relationship between the mol percent of CO in the reactor effluent and the surface area of produced black in square meters per gram, as measured by nitrogen adsorption. It is to be understood that this graph of line 70 illustrates the relationship within a limited range with a specific hydrocarbon feed under specific reactor conditions. However, other hydrocarbon feeds under reaction conditions controlled to produce a commercial type of carbon black exhibit similar characteristics and the conversion of such feeds to the desired type or quality of carbon black is controllable by sensing the CO concentration in the reactor effluent and regulating the ratio of tangential air to oil fed into the reactor. The surface area of carbon black can readily be controlled in the range of about 40 to 140 m.$^2$/g. based on nitrogen adsorption. To illustrate, commercial Philblack A, the lowest surface area furnace black, has a specification surface area of 44 m.$^2$/g., while Philblack E, the highest surface area black produced by a large carbon black producing company, has a specification surface area of 136 m.$^2$/g. Specification surface area for Philblack O is 76 m.$^2$/g., while that of Philblack I is 108 m.$^2$/g. These specification surface areas may vary from time to time, the broad range being from about 40 to 140 m.$^2$/g. based upon nitrogen adsorption.

Runs were made with an $SO_2$ extract oil having a BMCI of 91. The runs were conducted in a conventional, generally cylindrical reactor having a tangential pre-combustion section substantially as illustrated in the drawing with standard feed rates of tangential fuel gas and air. The oil rate was varied in the different runs with a constant flow rate of axial air. The data in the table below demonstrate the relationship between the varying oil feed rates, the CO concentration in the effluent, and the surface area of the produced carbon black.

TABLE

| Run No. | 1 | 2 | 3 | 4 | 5 |
| --- | --- | --- | --- | --- | --- |
| Oil rate (G/H) | 231 | 242 | 250 | 274 | 279 |
| CO (Mol percent) | 10.01 | 10.38 | 10.56 | 10.96 | 11.14 |
| $N_2SA$ (m.$^2$/g.) | 130 | 128 | 125 | 116 | 115 |

The data in the table demonstrate that the CO concentration rises as the oil feed rate is increased (increased ratio of oil to air) and that the surface area of the black decreases as the CO concentration increases, thus demonstrating the feasibility of control of surface area by sensing the CO concentration in the effluent and regulating the oil feed rate (or ratio of oil to air) to obtain the desired surface area. By varying reactor conditions and using the method of control of the invention, a carbon black of any surface area within the broad range of 40 to 140 m.$^2$/g. (based on $N_2$ adsorption) can be produced.

In general, in a process such as that illustrated in the foregoing runs, a change in mol percent of CO of ±0.2 represents a change in $N_2$ surface area of ± 2.5 m.$^2$/g. Controlling within this range requires a change in oil feed rate of about ±5 gallons per hour.

The control method of the invention is applicable to any carbon black process in which an oil feed is injected axially into a carbon black reactor or furnace for pyrolysis within a surrounding annulus of burning air-fuel gas mixture, whether said mixture is introduced tangentially or longitudinally around the axially injected oil. The following patents teach the injection of the air-fuel mixture longitudinally in an annular pattern around the axial oil feed: D. C. Williams, Patent No. 3,060,003; I. Williams, Patent No. 2,625,466; I. Williams, Patent No. 2,971,822.

Certain modifications of the invention will become apparent to those skilled in the art and the illustrative details disclosed are not to be construed as imposing unnecessary limitations on the invention.

I claim:

1. A method of controlling the surface area of carbon black formed by feeding into one end of a carbon black furnace a stream of normally liquid hydrocarbon oil and a combusting stream of air and fuel gas under conditions which produce a black of selected surface area, and recovering a gaseous effluent from the other end thereof containing said black, which method comprises the steps of:
   (1) analyzing said effluent to determine CO concentration therein as an indicator of surface area of said black;
   (2) maintaining a substantially constant ratio of air to fuel gas in said combusting stream; and
   (3) varying the flow rate of one of said combusting air and said oil as said CO concentration varies so as to maintain said concentration relatively constant, increasing the ratio of combusting air to oil when said CO concentration rises above a selected value and decreasing said air/oil ratio when said CO concentration falls below said value.

2. The method of claim 1 wherein the flow rate of air in step (3) is maintained substantially constant and the flow rate of oil is varied.

3. The method of claim 1 wherein the concentration of CO is sensed and the flow rate of oil in step (3) is regulated in response to the sensed value.

4. The method of claim 1 wherein the concentration of CO is sensed and the flow rate of combusting air in step (3) is regulated in response to the sensed value.

5. The method of claim 1 wherein the selected surface area of said black is in the range of about 40 to 140 square meters per gram ($N_2$ adsorption).

6. The method of claim 1 wherein said furnace comprises a cylindrical preheating section on the upstream end of a cylindrical main furnace section of lesser diameter and greater length than said preheating section, said combusting stream of air and fuel gas is introduced tangentially to said preheating section and said stream of oil is introduced axially thereto.

References Cited

UNITED STATES PATENTS

| 2,892,684 | 6/1959 | King | 23—209.6 |
| 2,953,436 | 9/1960 | Kron | 23—209.6 |
| 3,005,688 | 10/1961 | Williams | 23—259.5 |

EDWARD J. MEROS, Primary Examiner.